United States Patent [19]
Hegde

[11] Patent Number: 6,067,557
[45] Date of Patent: *May 23, 2000

[54] METHOD AND SYSTEM FOR ALLOCATING CPU BANDWIDTH BY PRIORITIZING COMPETING PROCESSES

[75] Inventor: Dinesh Hegde, N. Chelmsford, Mass.

[73] Assignee: Cabletron Systems, Inc., Rochester, N.H.

[*] Notice: This patent issued on a continued prosecution application filed under 37 CFR 1.53(d), and is subject to the twenty year patent term provisions of 35 U.S.C. 154(a)(2).

[21] Appl. No.: 08/709,124

[22] Filed: Sep. 6, 1996

[51] Int. Cl.⁷ ........................................................ G06F 9/00
[52] U.S. Cl. .............................................. 709/103; 709/102
[58] Field of Search .................................... 395/673, 674, 395/732; 709/100–108

[56] References Cited

U.S. PATENT DOCUMENTS

| | | | |
|---|---|---|---|
| 506,987 | 4/1996 | Abramson et al. | 395/650 |
| 4,481,583 | 11/1984 | Mueller | 395/732 |
| 5,475,844 | 12/1995 | Shiramizu et al. | 395/700 |

OTHER PUBLICATIONS

David L. Black, Scheduling Support for Concurrency and Parallelism in the Mach Operating System, CMU Technical Report CMU–CS–90–125 Apr./1990 Revised Version in May/1990 Issue of IEEE Computer.

D'Hollander, Norst Case Bounds for Independent Task Scheduling, Parcella 86, pp. 243–250, 1986.

Martel, A Parallel Algorithm for Preemptive Scheduling of Uniform Machines, Journal of Parallel and Distributed Computing V:5 No. 6 pp. 700–715, Dec. 1988.

*Primary Examiner*—Majid A. Banankhah
*Attorney, Agent, or Firm*—Wolf, Greenfield & Sacks, P.C.

[57] ABSTRACT

A method and system of allocating bandwidth between a plurality of competing processes, the method comprising the steps of (a) registering, within a computer, the plurality of processes, each having an assigned priority from highest priority to lowest priority; (b) assigning to each of the plurality of processes a count value relative to each of the process' priority, wherein the lowest priority process is assigned a base count value, and each higher priority process is assigned a count value which is determined based on the ratio of its priority to the process with the lowest priority; (c) determining the process having the highest count value; (d) executing the process having the highest count value, wherein if more than one process has the same highest count value, the currently executing process continues to be executed if it is one of the processes having the highest count value, otherwise, one of the processes having the same highest count value is selected based on a predetermined criteria; (e) decrementing the count value of the currently executing process; (f) repeating steps (c)–(e) until the count value of each process is zero; (g) reassigning the initial respective count values to processes which are not complete; and (h) repeating steps (c)–(g) until each process is complete.

28 Claims, 4 Drawing Sheets

METHOD AND SYSTEM FOR ALLOCATING CPU BANDWIDTH BY PRIORITIZING COMPETING PROCESSES

FIELD OF THE INVENTION

This invention relates generally to communications networks, and more particularly to a method and system for allocating CPU bandwidth by prioritizing competing processes.

BACKGROUND OF THE INVENTION

Most data communications networks today rely heavily on shared-media, packet-based LAN technologies for both access and backbone connections. These networks use bridges and routers to connect multiple LANs into global internets.

A router-based, shared-media network cannot provide the high bandwidth and quality of service required by the latest networking applications and new faster workstations. For example, multimedia and full-motion video applications consume large amounts of bandwidth and require real-time delivery. Another high bandwidth application involves transmission of X-ray and other diagnostic information to enable doctors in different locations to consult while accessing the same patient information. Yet another application is "collaborative" engineering, i.e., allowing multiple engineers to work on the same project simultaneously while at different geographic locations. Thus, networks once used primarily for sending text files and E-mail or sharing common databases, are now being pushed to their limits as more users push more data across them.

One way to provide additional bandwidth on a given network segment is with larger shared-media pipes, such as FDDI or Fast Ethernet; however, this does not enable the application of policy or restricted access to the enhanced network resources. Alternatively, a network can be further segmented with additional router or bridge ports; however, this increases the cost of the network and the complexity of its management and configuration.

Switched networking is a proposed solution intended to provide additional bandwidth and quality of service. In such networks, the physical routers and hubs are replaced by switches and a management system is optionally provided for monitoring the configuration of the switches. The overall goal is to provide a scalable high-performance network where all links between switches can be used concurrently for connections.

One proposal is to establish a VLAN switch domain—a VLAN is a "logical" or "virtual" LAN in which users appear to be on the same physical (or extended) LAN segment, even though they may be geographically separated. However, many VLAN implementations restrict VLAN assignments to ports, rather than end systems, which limits the effectiveness of the VLAN groupings. Other limitations of existing VLAN implementations include excessive broadcast traffic (which consume both network bandwidth and end system CPU bandwidth), disallowing transmissions out of multiple ports, hop-by-hop switching determinations, and requiring multi-protocol routers to enable transmission between separate VLANs. Another problem with many VLAN switched networks is that although they allow a meshed topology, none of the redundant links can be active at the same time. Generally, the active links are determined by a spanning tree algorithm which finds one loop-free tree-based path through the network.

In computer networks and controllers, sharing of bandwidth-limited resources is commonly required. Bandwidth-limited resources may be hardware or software resources. Examples of bandwidth-limited, shared hardware resources are peripheral devices such as printers, scanners, memories, disk drives and backplane communication links. Backplane communications links are used to connect modules in a device, such as a computer, a network controller, or a network hub such as a bridge or a router. Examples of bandwidth-limited, shared software resources are processes such as compression/decompression algorithms, and memory access algorithms. These resources are referred to as bandwidth-limited because their bandwidth limits the rate at which data can be transferred to, from, or by the resource. The term bandwidth-limited, shared resource is meant to refer to a device or process having a bandwidth limit that determines the rate of transfer of data.

In a system such as a local area network bridge or router, a number of modules are contained in a chassis. Each of the modules has one or more ports which may be connected to users or other network segments. The modules are connected together via a backplane communications link over which data is transferred from one module to another resulting in the data being transferred from one port on one module to another port on another module. This backplane communications link, although typically having a high bandwidth and resulting high rate of data transfer (typically from several hundred megabits per second to several gigabits per second), is the limiting factor in determining how quickly data is transferred from one port on one module to another port on another module, because the backplane communications link can serve only one port at a time.

To ensure that all of the ports connected to the networking chassis have access to the backplane communications link, some type of arbitration is typically employed. Each of the ports on a module connected to the networking chassis may be considered a "competing device" that competes, along with all of the other ports connected to the networking chassis for access to the backplane communications link. The term "competing device" is meant to refer generally to any type of hardware device, software process, or firmware, or application program that is to make use of a bandwidth-limited, shared resource.

One approach to arbitrate between the competing devices has been to provide what is known as time division multiplexing (TDM). In a TDM arbiter, a time segment is determined. A time segment is a unit of time, typically fixed, during which a competing device would be allowed exclusive use of the bandwidth-limited, shared resource. One time segment is assigned for each competing device. If there were ten competing devices, then there would be ten time segments. Each of the competing devices is then assigned to one of the available time segments. This information is then used by a state machine that increments through each time segment to allow the particular competing device assigned to that segment to use the backplane communications link for its assigned time segment. After the state machine has stepped through all ten devices, the process loops back to the first segment and begins again. This results in each competing device being able to use one-tenth of the available bandwidth of the bandwidth-limited, shared resource.

In a TDM arbiter, the users of each time segment are fixed. For example, the first segment is always assigned to a particular port on the network chassis and the ninth segment is assigned to another particular port on the networking chassis. One of the problems with this type of arbiter is that if the port that is allocated a time segment is not requesting use of the backplane at that time, then that time segment will be wasted and the backplane communications link is idle during the assigned segment.

Another way to allocate the time segments of a bandwidth-limited, shared resource such as a backplane communications link is to use a so-called "Round-Robin" arbitration system. In a Round-Robin system, a list of the competing devices is compiled and stored. An allocation token allowing exclusive use of the backplane communications link is then passed among the list of competing devices, for example, in a sequential manner. By applying sets of rules to the allocation token, the token can be passed to a device that is not necessarily the next device in the list, thus allowing for some prioritizing of allocation among competing devices. The competing device that is in possession of the allocation token is then allowed to use the backplane communications link for a particular time period. One problem with this type of arbitration system is that if the device in possession of the allocation token does not require use of the backplane communications link, the backplane communication link is unused and idle for the particular time segment.

Other types of fixed allocation systems may be used that determine, at the beginning of a particular time segment, which competing device is to be allowed exclusive access to the backplane communications system. One problem with fixed allocation systems is that the arbitration requires a portion of the time segment to determine which competing device should use that particular time segment. Therefore, the rate at which data can be transmitted across the backplane communications link is reduced because a portion of the time segment must be used to perform arbitration.

Another disadvantage of the TDM and Round-Robin arbiters is that the latency of transmission of, for example, a data packet, may be increased due to the wasted time segments. That is, although a data packet from a particular port may be waiting and ready for transmission across the backplane communications link, the data packet cannot be transmitted until the TDM arbiter allows the port access to the backplane communications link or the Round-Robin token is allocated to the port.

One of the problems associated with these prior art systems is management lockout or the problem of the Network Management System (NMS) losing contact with the switch. This is undesirable because the network manager loses its ability to manage the switch. For example, the network manager would not be able to enforce a policy on time if the NMS could not "talk" to the switch due to its losing contact with the switch.

The problem of losing contact with the switch(es) is generally seen only under heavy load conditions. Under a heavy load, a majority of the network switches are busy switching the incoming packets leaving very minimal or no CPU time to process requests from a management station or to run other system processes. This problem can be seen on a majority of the switches using a single CPU because the systems are designed and developed to switch as many packets per second as possible with very little emphasis on executing other system processes.

For example, in bridge implementations, the entire bridging process is scheduled to run for every packet that is coming in and at a maximum load, so that the bridging process alone can take the entire bandwidth of a CPU. This may not be a problem for the bridge because the NMS plays very little or no role in running a bridge. However, an entire switch code can not be run as a single process because setting up a connection and/or enforcing a policy is more complicated. Also, on a switch device, the management functionality is as important as switching the packets and hence the subsystems handling the switching process and the other processes should be given a fair share of the CPU time.

Another problem is the number of connections a switch can set up in a given period of time. In a policy-based environment, every unknown packet received by the switch has to be examined and processed prior to setting up the connection. The processing steps include signalling the policy server, applying the policy, and if the policy allows the connection, setting up the connection on the switch. These steps have to be carried out as quickly as possible in order to process all of the incoming packets. If these processes are not allocated enough CPU bandwidth, the time required to set up a connection increases. This latency in setting up a connection may result in the need for retransmissions (that take extra network bandwidth) or a failure of the two systems to talk to one another (which may cause a failure of an application). For example, when a user on a sales department computer is trying to contact another system in the marketing department using a "ping" command, if the switch connecting those two computers fails to set up the connection on time, the "ping" command fails and the user assumes that the marketing system computer is down. To prevent these problems, the processes that sets up connections on a switch should be allocated the required CPU bandwidth on time.

Another problem is prioritizing. Consider a case where the switch has to process all the incoming packets while giving a slightly higher priority to IP packets. Usually, changing the process priorities depending on the real-time behavior of the system is difficult and is therefore not done.

SUMMARY OF THE INVENTION

The present invention solves the above problems by allocating a guaranteed percentage of CPU bandwidth to a process or a group of processes in the system. With bandwidth allocation, a process or a group of processes are guaranteed to get their share of CPU time irrespective of the network traffic load. Thus, all the important processes including the process which services the requests from the NMS, the process which signals the policy server to enforce a policy, and the process which maps or un-maps connections are guaranteed to run on time. Also, the present method of bandwidth allocation adds some amount of deterministic behavior to the system.

The present invention can also be used to prioritize processes in complex systems. For example, the processes that process different protocols, such as IP or IPX, can be guaranteed a certain amount of bandwidth and prioritized. If the switch is in a network where IP traffic should be given a higher priority than IPX traffic, the IP protocol processor may be given a higher percentage of CPU bandwidth than IPX, thus guaranteeing that the IP protocol processor takes precedence over the IPX protocol processor.

In one embodiment of the present invention, a method of allocating bandwidth between a plurality of competing processes is provided. The method may comprise the steps of (a) registering, within a computer, the plurality of processes, each having an assigned priority from highest priority to lowest priority; (b) assigning to each of the plurality of processes a count value relative to each of the process' priority, wherein the lowest priority process is assigned a base count value, and each higher priority process is assigned a count value which is determined based on the ratio of its priority to the process with the lowest priority; (c) determining the process having the highest count value; (d) executing the process having the highest count value, wherein if more than one process has the same highest count value, the currently executing process continues to be executed if it is one of the processes having the highest count value, otherwise, using a predetermined selection function such as the one of the processes having the same highest count value which was registered earlier in time is executed; (e) decrementing the count value of the currently executing process; (f) repeating steps (c)–(e) until the count value of each process is zero; (g) reassigning the initial respective count values to processes which are not complete; and (h) repeating steps (c)–(g) until each process is complete.

According to another embodiment of the present invention, a method for allocating bandwidth between a plurality of competing processes is provided, in which the method may comprise the steps of (a) registering each of the plurality of processes and an associated bandwidth requirement; (b) ranking the plurality of processes based on each process' bandwidth requirement; (c) determining which process should be executed based on the ranking; and (d) executing the process determined in step (c).

According to another embodiment of the present invention, a system for allocating bandwidth between a plurality of competing processes is provided. The system may comprise management means for assigning a count value to each of the plurality of processes, allocating a percentage of bandwidth to each of the processes based upon the count values and executing one of the plurality of processes, and system timer means for interrupting the management means to cause the management means to reiteratively determine which of the plurality of processes should be currently executed based on the percentage of bandwidth allocated to each process.

DETAILED DESCRIPTION

Figure 1:
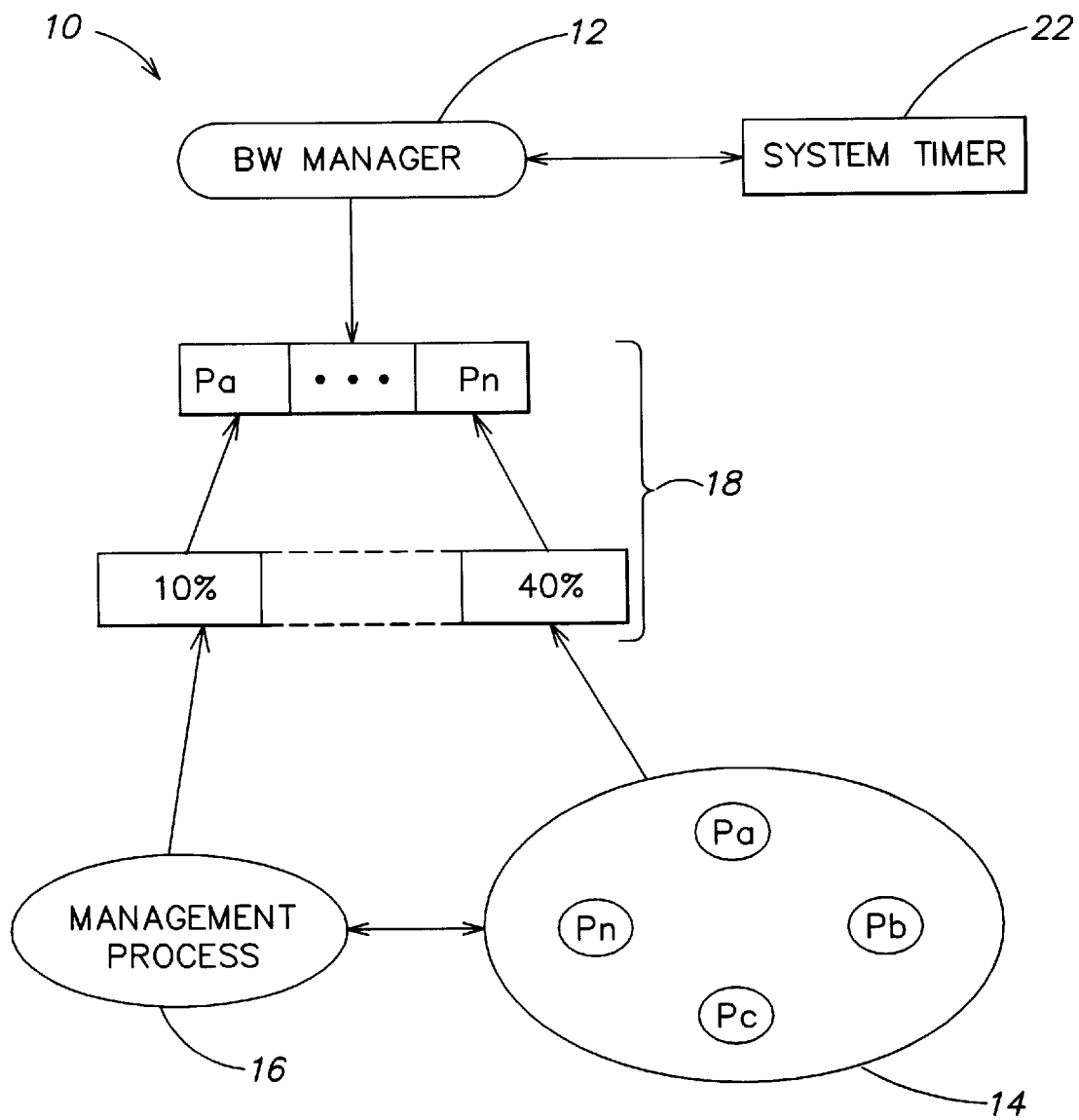
FIG. 1 is a schematic drawing of a system in accordance with the present invention.

FIG. 1 is a schematic drawing showing one embodiment of a bandwidth allocation system 10 according to the present invention. The system includes bandwidth manager 12, which manages system processes 14, including processes Pa, Pb, Pc . . . Pn, and a management process 16. Bandwidth manager 12 lists processes 14 and 16 and the bandwidth requirements of each process in a CPU use table 18. System timer 22 provides timing signals to bandwidth manager 12.

The system has a "preemptive priority" environment. In other words, a higher priority process should be able to preempt the currently executing process without waiting for the currently running process to voluntarily give up the CPU. This allows all of the processes their share of CPU bandwidth irrespective of how busy the system is. Also, since the system behavior and allocation of CPU bandwidth are dependent on each other, a particular process' CPU share may be dynamically adjusted. The share of a process may increase or decrease depending on how busy the system is and how much the process has to do.

The bandwidth allocation and management is done by CPU bandwidth manager 12. All the processes requiring a certain amount of CPU bandwidth are registered with the CPU bandwidth manager. The CPU bandwidth manager keeps track of processes 14 and 16, the percentage of CPU bandwidth or use, and all the other required information in the CPU use and bandwidth allocation table 18 When the system gets interrupted by a system timer interrupt from system timer 22, or on every timer tick, the CPU bandwidth manager determines which process is allocated the next tick of CPU bandwidth by looking at table 18. The values in the table are updated every timer tick and process priorities are adjusted so that the appropriate process is scheduled for the next tick and the requested percentage of CPU bandwidth is given to each process.

CPU bandwidth manager 12 is responsible for allocating and managing the CPU bandwidth. The CPU bandwidth manager runs as a part of system timer code. Normally, the operating system gets interrupted by the system timer every timer tick and a corresponding Interrupt Service Routine (ISR) is executed to service the interrupt. Since CPU bandwidth manager 12 has to keep track of time, it is notified as a part of the Interrupt Service Routine. On every timer tick, CPU bandwidth manager 12 updates table 18, where priority, required CPU use, and all other required information is stored on a per process basis.

The interrupt, which is part of management process 16, is allocated the highest priority. This ensures that the system keeps track of the time and therefore ensures that all the other time based calculations are accurate. The system timer Interrupt Service Routine notifies CPU bandwidth manager 12 so that it can determine whether to allocate the next timer tick of CPU bandwidth to the currently executing process or the next process in the queue.

CPU use table 18 is similar to a ready queue where all the processes ready to run are placed in a predetermined order. Periodically, this table is updated to reflect the changes in the bandwidth allocation table and/or each process' CPU use. The processes are ordered based on a count value which is relative (proportional) to each process' bandwidth requirement. For example, if process Pa has requested 10%, process Pb has requested 30%, and process Pc has requested 50%, the proportional count values in table 18 for the processes Pa, Pb, and Pc would be 1, 3, and 5 respectively. The total requested bandwidth of all registered processes must add up to 100%.

Figure 2A:
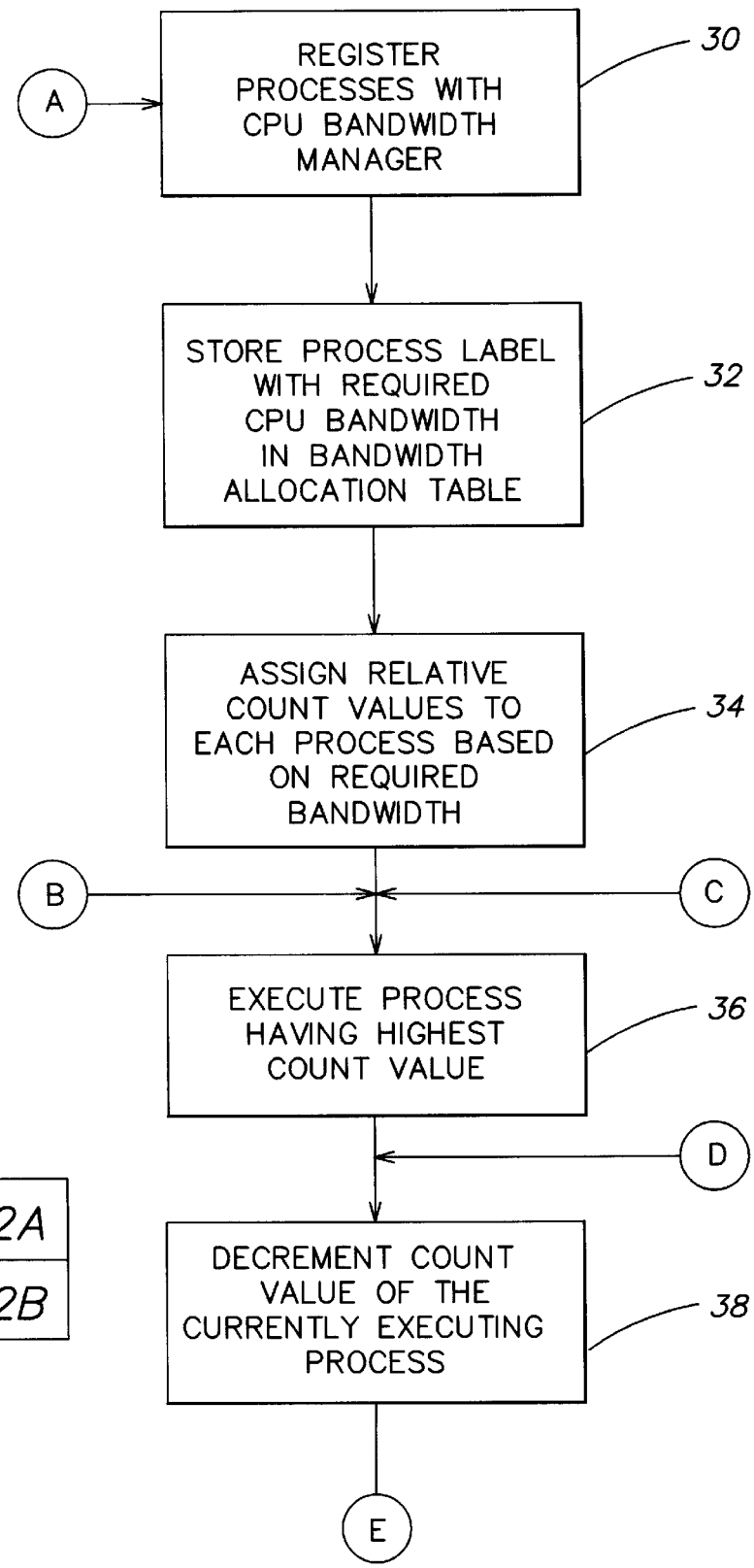
FIGS. 2A and 2B is a flow diagram of a process in accordance with the present invention.
Figure 2B:
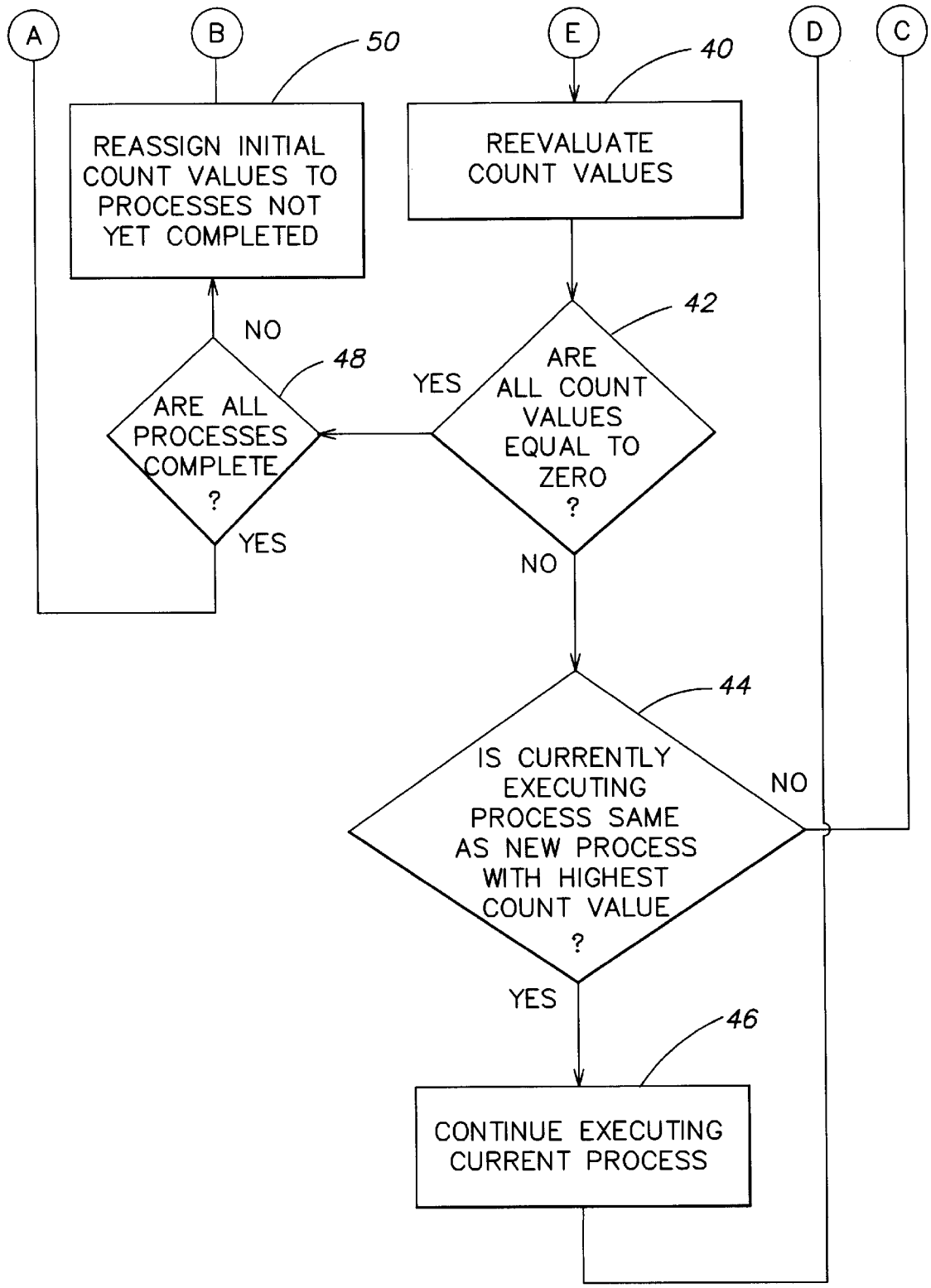

FIG. 2 is a flow chart which details the method of the present invention. In step 30, processes 14 and 16 are registered with CPU bandwidth manager 12, which stores each process, a corresponding process label, and each process' bandwidth requirement in the CPU use and bandwidth allocation table 18 (step 32). In step 34, each process is assigned a count value determined relative to the process' bandwidth requirement. In other words, the process which requires the lowest bandwidth percentage is assigned a base count value, such as 1. The remaining processes are assigned a count value between the base count value and the highest count value in relative correspondence to each process' required bandwidth.

Each of the following steps takes place based on timing signals from system timer 22. In step 36, the process currently assigned the highest count value is executed and, in step 38, its count value is decremented by one. Bandwidth manager 12 then reevaluates the count values in table 18 (step 40). If any of the count values is greater than zero (step 42), and if the currently executing process is the same as the process with the highest count value (step 44), the currently executing process is continued (step 46), and its count value is decremented by one (step 38). The count values are then reevaluated (step 40).

After step 40, if any of the count values are greater than zero (step 42), and if the currently executing process is no longer the process with the highest count value (step 44), the system loops back to step 36 where the process having the current highest count value is executed, and its count value is decremented by one (step 38).

After step 40, if all of the count values of the processes are equal to zero (step 42), and if any of the processes are incomplete (step 48), the initial count values are respectively reassigned to the incomplete process (step 50). For example, if, in step 34, process Pa was initially assigned a count value of 4, and process Pb was initially assigned a count value of 3, and, after these count values were both decremented to zero through the procedure described above, at step 50, processes Pa and Pb would be reassigned count values of 4 and 3, respectively. The system then loops back to step 36, where the process with the highest count value is executed. Once all of the processes have been completed (step 48), the system loops back to step 30 to register new processes.

The following is an example of the method described above. In this example, the following are the registered processes and the corresponding CPU percentage use requested (steps 30–32):

| Process label | Required bandwidth |
| --- | --- |
| Process - Pa | 5% |
| Process - Pb | 20% |
| Process - Pc | 30% |
| Process - Pd | 20% |
| Others - Po | 25% |

In step 34, the count values are determined by taking the lowest percentage as base count value 1. All the other counts are calculated as factors of the lowest percentage relative to the base count value. In this example, each bandwidth percentage is divided by the lowest bandwidth percentage, 5%, in order to obtain each process' respective count value, as shown below:

| Process label | Count value |
| --- | --- |
| Process | - Pa ==>1 |
| Process | - Pb ==>4 |
| Process | - Pc ==>6 |
| Process | - Pd ==>4 |
| Others | - Po ==>5 |

Based on the above, since Process Pc has the highest count value, it is the process which is executed first (step 36).

Every time the system gets the system timer interrupt, the system timer interrupt service routine is executed. Also, the CPU Bandwidth Manager operates so that it can allocate the next tick of CPU use to the appropriate process. The CPU Bandwidth Manager decrements the use count of the currently executing process, Pc, in the CPU use count table 18 (step 38), and schedules the process with the highest count value. Since all count values are not equal to zero (step 42), the system proceeds to step 44. If the currently executing process is the same as the process with the current highest count rate, then the currently executing process, Pc, is continued (step 46). If not, the manager is notified to execute the process with the highest count value by preempting the currently running process (step 36). In the example, process Pc was initially executed. After the first timer tick, the table entries are as follows:

| |
| --- |
| Process - Pa ==>1 |
| Process - Pb ==>4 |
| Process - Pc ==>5 |
| Process - Pd ==>4 |
| Others - Po ==>5 |

The process Pc is allowed to continue to run because there is no other process with a higher count value than process Pc. In other words, if the count of currently executing process is not the highest but equal to the count value of other processes in the table, the current process is allowed to continue without preempting it (step 46).

After the second timer tick, the count value of process Pc is decremented to 4 (step 38). After step 44, one of the processes in the "Others" group is executed in step 36 because it now has the highest count value, 5. The table now looks as follows:

| |
| --- |
| Process - Pa ==>1 |
| Process - Pb ==>4 |
| Process - Pc ==>4 |
| Process - Pd ==>4 |
| Others - Po ==>5 |

After the third timer tick, the process in the "Others" group is allowed to continue to run. As explained above, if the count value of the currently executing process is at least equal to the count values of the other processes in the table, the current process, Po, is allowed to continue without preempting it. The resulting table is as follows:

| |
| --- |
| Process - Pa ==>1 |
| Process - Pb ==>4 |
| Process - Pc ==>4 |
| Process - Pd ==>4 |
| Others - Po ==>4 |

After the fourth timer tick, the count value of Po is decremented to 3 (step 38). There are now multiple processes (other than Po) with the highest count value, 4, and the process which will be executed is selected according to predetermined criteria, such as which process was registered earlier in time. In this example, process Pb is executed. The table is now as follows:

| |
| --- |
| Process - Pa ==>1 |
| Process - Pb ==>4 |
| Process - Pc ==>4 |
| Process - Pd ==>4 |
| Others - Po ==>3 |

This process continues until all the count values reach zero (step 42). The initial count values are then reassigned (step 50), and the same rules are applied to execute the remaining incomplete processes. At any time through this process, if the CPU bandwidth allocation is computed, it will be seen that all the processes are given their share of CPU bandwidth.

A process can "un-register" with the bandwidth manager in step 48 if it is complete. Its share of CPU is then allocated to all other incomplete processes in the system. Also, there is no need for every process in the system to register with the bandwidth manager. All the processes that have not registered with the bandwidth manager will be treated as a single group of processes, such as Process Po, above, and are allocated whatever CPU bandwidth is available after the registered processes are allocated their required bandwidth.

Figure 3:
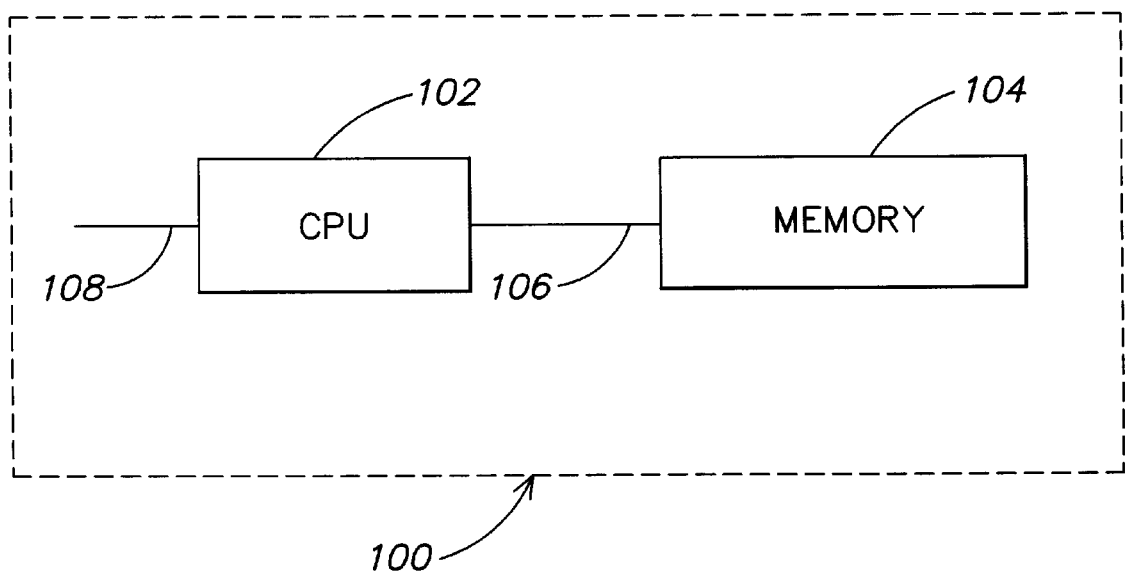
FIG. 3 is a schematic diagram of a complete system within which the present invention may be implemented.

The method of the present invention may be implemented in a general purpose computer 100 as shown in FIG. 3. The computer may include a computer processing unit (CPU) 102, memory 104, a processing bus 106 by which the CPU can access the memory 104, and access to a network 108.

The invention may be a computer apparatus which performs the method previously described. Alternatively, the invention may be a memory 104, such as a floppy disk, compact disk, or hard drive, which contains a computer program or data structure, for providing to a general computer instructions and data for carrying out the method.

Having thus described the invention, various modifications and improvements will readily occur to those skilled in the art and are intended to be within the scope of the invention. Accordingly, the foregoing description is by way of example only, and not intended to be limiting.

What is claimed is:

1. A method of prioritizing an allocation of bandwidth between a plurality of competing processes, the method comprising the steps of:
   a). registering, within a computer, said plurality of processes each having a prioritized count value from highest to lowest priority, wherein the priority is based on the percentage of bandwidth assigned to each of said plurality of processes;
   b). determining the process having the highest priority count value;
   c). executing the process having the highest priority count value on a preemptive priority basis, wherein if more than one process has the same highest priority count value, the currently executing process continues to be executed if it is one of the processes having the highest priority count value, otherwise, one of the processes having the same highest priority count value is selected based on a predetermined criteria;
   d). decrementing the count value of the currently executing process;
   e). repeating steps (b)–(d) until the count value of each process is zero;
   f). reassigning the initial respective count values to processes which are not complete;
   g). repeating steps (b)–(f) until each process is complete.

2. The method of claim 1 wherein, in step (a), said plurality of processes is registered in a table in a memory of the computer.

3. The method of claim 2, wherein step (b) is reiterated at regular intervals in order to continuously determine which process has the highest priority count value by referring to said table.

4. A system for allocating bandwidth between a plurality of competing processes comprising:
   management means for assigning a count value to each of said plurality of competing processes, each competing process having a respective required bandwidth, wherein a base count value of lowest priority is assigned to the competing process having a lowest required bandwidth percentage, and a higher priority count value is determined for each other process based on a ratio of the required bandwidth of the process to the required bandwidth of the process with the lowest priority,
   means for executing the one of said plurality of processes having the determined highest priority count value; and
   system timer means for interrupting said management means to cause said management means to reiteratively determine which of said plurality of processes should be currently executed based on the determined highest priority count value.

5. The system of claim 4 wherein said management means determines which of said plurality of processes should be currently executed by referring to a table stored in computer memory which lists each of said plurality of processes and their respective count values.

6. The system of claim 5 wherein said management means executes the process currently assigned the highest count value.

7. The system of claim 5 wherein said management means refers to said table to determine which of said plurality of processes should be currently executed at regularly timed intervals as dictated by said system timer means.

8. The system of claim 7 wherein said management means decrements the count value of the process which is being currently executed, reevaluates said count values and executes the process which then has the highest count value.

9. A method for allocating bandwidth between a plurality of competing processes the method comprising the steps of:
   a) registering in a table within a computer, each of said plurality of competing processes and an associated bandwidth requirement;
   b) ranking said plurality of processes based only on each process' bandwidth requirement;
   c) determining which process should be executed based on said ranking; and
   d) executing the process determined in step (c).

10. The method of claim 9, wherein step (b) comprises assigning a count value to each of said plurality of processes, said count value being determined relative to each process' bandwidth requirement, in which the process which requires the lowest bandwidth is assigned a base count value and the remaining processes are assigned a count value between the base count value and a highest count value in relative correspondence to each process' bandwidth requirement.

11. The method of claim 10 wherein step (c) comprises referring to said table to find the process with the highest count value.

12. A method for prioritizing an allocation of bandwidth of a bandwidth-limited resource between competing devices comprising the steps of:
   interrupting the bandwidth-limited resource on a preemptive priority basis in order to allow a reassignment of the bandwidth;
   providing a requested bandwidth for each competing device;
   determining a count value for each competing device wherein the count values are ordered for priority of execution based on the required bandwidth of the corresponding competing device; and
   decrementing the count value of the competing device executing prior to the interrupting step.

13. The method of claim 12, wherein the competing device having the highest priority count value is selected for execution.

14. The method of claim 13, wherein the competing device executing prior to the interrupting step is selected to continue execution if its count value is equal to the highest priority count value.

15. The method of claim 12, wherein the steps are repeated until the count value of each competing device is zero.

16. The method of claim 15, wherein after the repeated steps the count values are redetermined for the competing devices having required bandwidth.

17. The method of claim 12, wherein the count value of the competing device having the lowest required bandwidth is assigned a base count value and the remaining competing devices are assigned count values between the base count value and a highest count value in relative correspondence to their required bandwidth.

18. The method of claim 17, wherein the highest count value has the highest priority.

19. The method of claim 12, wherein the count value for each competing device is a ratio of its required bandwidth divided by the lowest required bandwidth of all competing devices.

20. The method claim 12, wherein the bandwidth-limited resource comprises CPU bandwidth.

21. The method of claim 20, wherein the competing devices comprise competing processes.

22. The method of claim 12, wherein the bandwidth-limited resource comprises a network backplane link and the connecting devices comprise ports requiring access to the link.

23. The method of claim 12, wherein the interrupting step is caused by a system timer.

24. The method of claim 23, wherein the system timer manages the bandwidth allocation.

25. The method of claim 12, wherein the bandwidth-limited resource comprises a network switch and the competing devices include network management and connection processes.

26. A system for prioritizing an allocation of bandwidth among a plurality of competing devices to a bandwidth-limited resource comprising:

the bandwidth-limited resource being subject to interruption by a system timer on a pre-emptive priority basis in order to pre-empt a currently executing one of the plurality of competing devices and determine an updated allocation of bandwidth between the competing devices;

a data structure including, for each of the plurality of competing devices, a required bandwidth, and a count value having a priority based on its required bandwidth; and an execute process causing execution of the competing device having the highest priority count value.

27. The bandwidth allocation system of claim 26, wherein the competing devices comprise competing processes.

28. The bandwidth allocation system of claim 27, wherein the bandwidth-limited resource comprises CPU bandwidth.

\* \* \* \* \*